United States Patent
Tong et al.

(10) Patent No.: US 8,238,460 B2
(45) Date of Patent: Aug. 7, 2012

(54) METHOD AND SYSTEM FOR RETRANSMITTING DATA PACKETS

(75) Inventors: Wen Tong, Ottawa (CA); Ming Jia, Ottawa (CA); Jianglei Ma, Kanata (CA); Peiying Zhu, Kanata (CA)

(73) Assignee: Apple Inc., Cupertino, CA (US)

( * ) Notice: Subject to any disclaimer, the term of this patent is extended or adjusted under 35 U.S.C. 154(b) by 429 days.

(21) Appl. No.: 11/795,530

(22) PCT Filed: Dec. 28, 2005

(86) PCT No.: PCT/CA2005/001976
§ 371 (c)(1),
(2), (4) Date: Apr. 4, 2008

(87) PCT Pub. No.: WO2006/076787
PCT Pub. Date: Jul. 27, 2006

(65) Prior Publication Data
US 2009/0046797 A1    Feb. 19, 2009

(51) Int. Cl.
*H04L 1/02* (2006.01)
(52) U.S. Cl. ........ 375/267; 375/260; 375/295; 375/299; 375/347; 375/262; 375/275; 375/316; 375/348; 375/349
(58) Field of Classification Search .................. 375/260, 375/267, 295, 299, 343, 262, 275, 316, 347; 375/348, 349; 455/132, 135, 225, 504, 517; 370/203, 204, 205, 208, 209, 210
See application file for complete search history.

(56) References Cited

U.S. PATENT DOCUMENTS

| 7,761,775 B2* | 7/2010 | Gesbert et al. ............... 714/774 |
| 2003/0072285 A1* | 4/2003 | Onggosanusi et al. ........ 370/335 |
| 2003/0156572 A1* | 8/2003 | Hui et al. ...................... 370/349 |

FOREIGN PATENT DOCUMENTS
WO    WO 2004/028063    1/2004

OTHER PUBLICATIONS

Van Nguyen, A. et al.: "Hybrid ARQ protocols using space-time codes" Vehicular Technology Conference. 2001.VTC 2001 Fall. IEEE VTS 54TH vol. 4, Jul. 11, 2001 pp. 2364-2368.

Mi-Kyung, Oh et al.: "Efficient hybrid ARQ with Space-time Coding and low-complexity decoding" Acoustice, Speech and Signal Processing, 2004 Proceedings (ICass '04) IEEE.

* cited by examiner

*Primary Examiner* — Dhaval Patel
(74) *Attorney, Agent, or Firm* — Meyertons, Hood, Kivlin, Kowert & Goetzel, P.C.

(57) ABSTRACT

A method and system are provided for minimizing errors by retransmitting packets in a multiple-input-multiple-output (MIMO) space-time coded packet radio. A packet is transmitted using a first STC code mapping, the mapping including well-known symbol operations, and optional signal weighting. When transmission errors are detected the packet is re-transmitted using STC code mappings selected in turn from a deterministic sequence of STC code mappings. The STC code mappings are chosen in accordance with one or more principles.

26 Claims, 7 Drawing Sheets

METHOD AND SYSTEM FOR RETRANSMITTING DATA PACKETS

FIELD OF INVENTION

The present invention relates to wireless communications, and more specifically to packet re-transmissions for error correction.

BACKGROUND OF THE INVENTION

It is well known that space time transmit diversity (STTD) can achieve symbol level diversity which significantly improves link performance. STTD code is said to be 'perfect', therefore, in the sense that it achieves full space time coding rate (Space time coding rate=1, also called rate-1), and it is orthogonal. When the number of transmit antennas is more than 2, however, rate-1 orthogonal codes do not exist.

Multiple Input Multiple Output (MIMO) technologies have been proposed for next generation wireless cellular systems, such as the third generation partnership project (3GPP) standards. MIMO systems use multiple antennas for both transmission and reception. Because multiple antennas are deployed in both transmitters and receivers, higher capacity or transmission rates can be achieved.

When using the MIMO systems to transmit packets, if a received packet has an error, the receiver may require re-transmission of the same packet. Systems are known that provide for packet symbols to be mapped differently than the original transmission.

In a closed loop system, the packet receiver can also indicate to the transmitter the best mapping of the re-transmit format.

In known systems, the possibility exists for certain symbol mappings to be ineffective in overcoming interference.

Thus a need exists for an improved ways to facilitate MIMO re-transmissions.

SUMMARY OF THE INVENTION

It is an object of the invention to provide a method and system that obviates or mitigates at least one of the disadvantages of existing systems.

According to the present invention there is provided a method for minimizing errors in communicating packets comprising symbols, for use in a multiple-input-multiple-output (MIMO) space-time block coded (STC) packet radio communications system having at least two transmit antennas, the method comprising: determining a sequence of transmitter STC code mappings, the sequence including at least two STC code mappings, transmitting a packet using a first STC code mapping in the sequence, detecting a first transmission error and retransmitting the packet using a subsequent STC code mapping in the sequence, detecting a subsequent transmission error and retransmitting the packet using a further subsequent STC code mapping in the sequence, repeating the steps as necessary.

Other aspects and features of the present invention will be readily apparent to those skilled in the art from a review of the following detailed description of preferred embodiments in conjunction with the accompanying drawings.

BRIEF DESCRIPTION OF THE DRAWINGS

These and other features of the invention will become more apparent from the following description in which reference is made to the appended drawings wherein.

DETAILED DESCRIPTION OF PREFERRED EMBODIMENT(S)

Embodiments of the present invention are described using a MIMO communication system. The MIMO communication system implements packet re-transmission schemes for use in accordance with the IEEE 802.16(e) and IEEE 802.11 (n) standards. The packet re-transmission schemes described below may be applicable to other wireless environments, such as, but not limited to, those operating in accordance with the third generation partnership project (3GPP) and 3GPP2 standards.

In the following description, the term 'STC code mapping' is used to denote a mapping of symbols to antennas, where each symbol in such a mapping may be replaced by its conjugate (e.g. $S_1^*$), or a rotation (e.g. $jS_1$, $-S_1$ and $-jS_1$), or a combination of its conjugate and a rotation (e.g. $jS_1^*$). In some embodiments, the mapping also includes a signal weighting for each antenna.

It is well-known to use derivations of Alamouti code for STC code mappings. Alamouti code requires two antennas at the transmitter and provides maximal transmit diversity gain for two antennas. A scheme for use in re-transmitting a MIMO packet using four transmit antennas, and using two such mappings, derived from Alamouti code, is shown in Table 1. As shown in Table 1, the first and a subsequent re-transmission of a MIMO packet take place using 'double STTD' STC code mappings. It is well known to obtain these mappings by modifying the STTD technique.

TABLE 1

| | (Prior art) | | | |
| --- | --- | --- | --- | --- |
| | Tx-1 | Tx-2 | Tx-3 | Tx-4 |
| Time 1 | $S_1$ | $S_2$ | $S_3$ | $S_4$ |
| Time 2 | $-S_2^*$ | $S_1^*$ | $-S_4^*$ | $S_3^*$ |

In this and subsequent tables $S_i$ represents the ith symbol, the mark '*' denotes a conjugate, j is the imaginary operator, Tx-k represents the kth transmit antenna, and Time y represents the sequence of STC code mappings.

Beyond the first retransmission, the two STC code mappings defined in Table 1 may be used alternately to re-transmit until the data packet is successfully decoded at the receiver.

Figure 1:
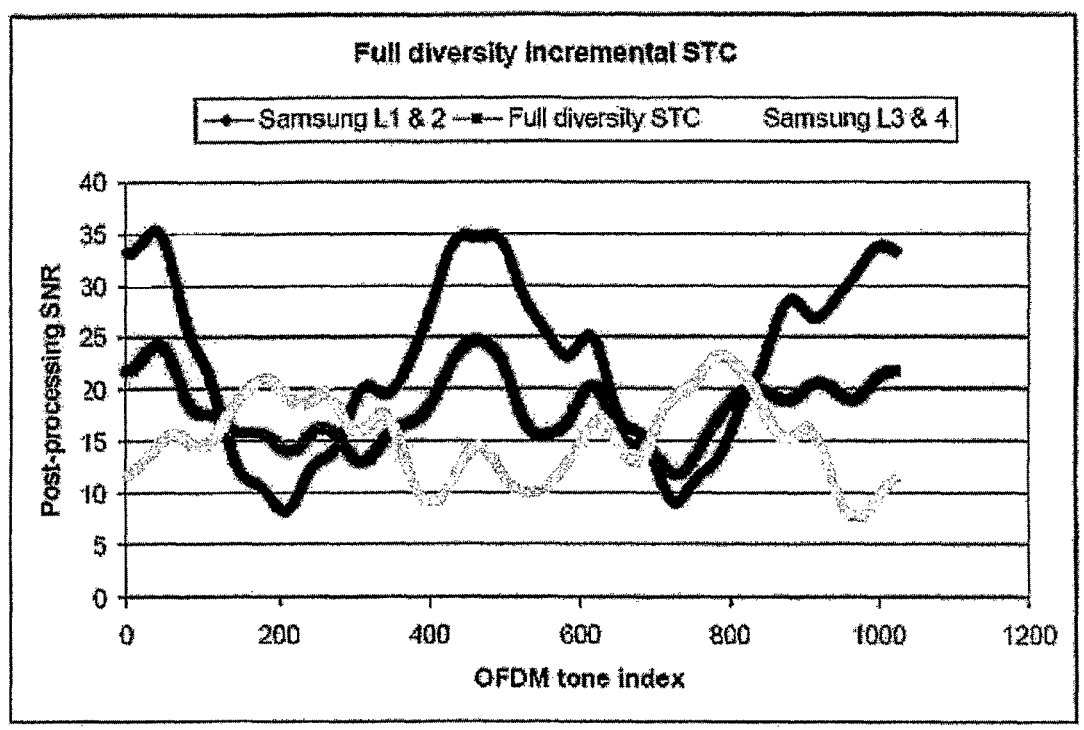
FIG. 1 illustrates the gain of Full diversity STC and the smoothness of channel response.

FIG. 1 shows the effects of full-level diversity: i.e. all layers have the same level of signal-to-noise ratio (SNR), which is approximately the average of the two layer SNRs in the Table 1 scheme. This symbol level full diversity is advantageous in terms of forward error correction (FEC) coding gain, especially for data with higher coding rates.

To improve performance for the combining of the retransmitted packet, symbols of the re-transmit packet may be mapped differently from the previous transmission, and/or may be adjusted by different weights. A scheme for re-transmitting MIMO packets using four transmit antennas is shown in Table 2.

TABLE 2

(Prior art)

| | Tx-1 | Tx-2 | Tx-3 | Tx-4 |
|---|---|---|---|---|
| Time 1 | $S_1$ | $S_2$ | $S_3$ | $S_4$ |
| Time 2 | $-S_2^*$ | $S_1^*$ | $-S_4^*$ | $S_3^*$ |
| Time 3 | $jS_1$ | $jS_2$ | $-jS_3^*$ | $-jS_4^*$ |
| Time 4 | $-jS_2^*$ | $jS_1^*$ | $jS_4^*$ | $-jS_3^*$ |

For more than four re-transmissions, the mapping may be further expanded into antenna label re-mapping to achieve full diversity in time and space.

Embodiments of the invention are now described.

A scheme for re-transmitting MIMO packets using four transmit antennas in accordance with an embodiment of the invention is shown in Table 3. Note that each symbol Si (or a direct derivative therefrom, i.e. a conjugate, or a 'rotation', or a conjugate and a 'rotation') is present in each time slot, and is always transmitted on a different antenna. The scheme of Table 3 is an open loop scheme.

TABLE 3

| | Tx-1 | Tx-2 | Tx-3 | Tx-4 |
|---|---|---|---|---|
| Time 1 | $S_1$ | $S_2$ | $S_3$ | $S_4$ |
| Time 2 | $-S_2^*$ | $S_1^*$ | $-S_4^*$ | $S_3^*$ |
| Time 3 | $S_3$ | $S_4$ | $S_1$ | $S_2$ |
| Time 4 | $-S_4^*$ | $S_3^*$ | $-S_2^*$ | $S_1^*$ |

In some embodiments, the concept of antenna grouping is applied to subsequent re-transmissions. With four transmit antennas a total of six ways of grouping antennas is possible, and these in turn can be used for twenty-four transmission times. However, it would be rare that so many transmissions would be needed. For example, in accordance with an embodiment of the invention Table 4 shows the 5th through 8th transmissions for a scheme of re-transmitting MIMO packets using four transmit antennas. It is used to extend Table 3. The scheme of Table 4 is an open loop scheme. Note that in Table 4, as in Table 3, each symbol $S_i$, or a direct derivative therefrom, is present in each STC code mapping (time slot), but in this case the symbol is not always transmitted on a different antenna. Because of the rare necessity to retransmit so many times, a design decision is made to limit the number of defined STC code mappings to eight. In situations requiring retransmissions exceeding the number of available mappings, the system retransmission count effectively uses modulo 8 and after time 8, would step to time 1 again.

TABLE 4

| | Tx-1 | Tx-2 | Tx-3 | Tx-4 |
|---|---|---|---|---|
| Time 5 | $S_1$ | $S_3$ | $S_2$ | $S_4$ |
| Time 6 | $-S_2^*$ | $-S_4^*$ | $S_1^*$ | $S_3^*$ |

TABLE 4-continued

| | Tx-1 | Tx-2 | Tx-3 | Tx-4 |
|---|---|---|---|---|
| Time 7 | $S_2$ | $S_4$ | $S_1$ | $S_3$ |
| Time 8 | $S_1^*$ | $S_3^*$ | $-S_2^*$ | $-S_4^*$ |

In some embodiments, to achieve improved performance each symbol is transmitted through all the four antennas as the tine sequence progresses. This ensures that (1) the inter-code interferences are minimized through orthogonality, or quasi-orthogonality; and (2) full symbol level diversity is achieved.

A scheme for re-transmitting MIMO packets using four transmit antennas in accordance with a further embodiment of the invention is shown in Table 5 (mapping-1). The scheme of Table 5 is a closed loop scheme. This is for closed-loop incremental STC. In this embodiment code-set indexes are fed back to a base transceiver station (BTS). Code-set indexes indicate how the constituent codes in a STC are formed. For example, index-1 can be used to indicate the combination [1-2, 3-4], which means that constituent code 1 is transmitted over antennas 1 and 2, while constituent code 2 is transmitted over antennas 3 and 4. Index=-2 can be used to indicate the combination [1-3, 2-4], where constituent code 1 is transmitted over antennas 1 and 3, while constituent code 2 is transmitted over antennas 2 and 4. The use of code-set indexes minimizes the bandwidth requirement of the feedback channel.

TABLE 5

| | Tx-1 | Tx-2 | Tx-3 | Tx-4 |
|---|---|---|---|---|
| Time 1 | $S_1$ | $S_2$ | $S_3$ | $S_4$ |
| Time 2 | $-S_2^*$ | $S_1^*$ | $-S_4^*$ | $S_3^*$ |
| Time 3 | $S_3$ | $S_4$ | $S_1$ | $S_2$ |
| Time 4 | $-S_4^*$ | $S_3^*$ | $-S_2^*$ | $S_1^*$ |

A scheme for re-transmitting MIMO packets using four transmit antennas in accordance with a further embodiment of the present invention is shown in Table 6 (mapping-2). The scheme of Table 6 is a closed loop scheme.

TABLE 6

| | Tx-1 | Tx-2 | Tx-3 | Tx-4 |
|---|---|---|---|---|
| Time 1 | $S_1$ | $S_3$ | $S_2$ | $S_4$ |
| Time 2 | $-S_2^*$ | $-S_4^*$ | $S_1^*$ | $S_3^*$ |
| Time 3 | $S_3$ | $S_1$ | $S_4$ | $S_2$ |
| Time 4 | $-S_4^*$ | $-S_2^*$ | $S_3^*$ | $S_1^*$ |

A scheme for re-transmitting MIMO packets using four transmit antennas in accordance with a further embodiment of the present invention is shown in Table 7 (mapping-3). The scheme of Table 7 is a closed loop scheme.

TABLE 7

| | Tx-1 | Tx-2 | Tx-3 | Tx-4 |
|---|---|---|---|---|
| Time 1 | $S_1$ | $S_3$ | $S_4$ | $S_2$ |
| Time 2 | $-S_2^*$ | $-S_4^*$ | $S_3^*$ | $S_1^*$ |
| Time 3 | $S_3$ | $S_1$ | $S_2$ | $S_4$ |
| Time 4 | $-S_4^*$ | $-S_2^*$ | $S_1^*$ | $S_3^*$ |

A scheme for re-transmitting MIMO packets using three transmit antennas In accordance with a further embodiment of the present invention is shown in Table 8 (mapping-1). The scheme of Table 8 is a closed loop scheme.

TABLE 8

|        | Tx-1    | Tx-2    | Tx-3    |
|--------|---------|---------|---------|
| Time 1 | $S_1$   | $S_2$   | $S_3$   |
| Time 2 | $-S_2^*$| $S_1^*$ | $S_3^*$ |
| Time 3 | $S_3$   | $S_1$   | $S_2$   |
| Time 4 | $-S_1^*$| $S_3^*$ | $S_2^*$ |
| Time 5 | $S_2$   | $S_3$   | $S_1$   |
| Time 6 | $-S_3^*$| $S_2^*$ | $S_1^*$ |

A scheme for re-transmitting MIMO packets using three transmit antennas in accordance with a further embodiment of the present invention is shown in Table 9 (mapping-2). The scheme of Table 9 is a closed loop scheme.

TABLE 9

|        | Tx-1    | Tx-3    | Tx-2    |
|--------|---------|---------|---------|
| Time 1 | $S_1$   | $S_2$   | $S_3$   |
| Time 2 | $-S_2^*$| $S_1^*$ | $S_3^*$ |
| Time 3 | $S_3$   | $S_1$   | $S_2$   |
| Time 4 | $-S_1^*$| $S_3^*$ | $S_2^*$ |
| Time 5 | $S_2$   | $S_3$   | $S_1$   |
| Time 6 | $-S_3^*$| $S_2^*$ | $S_1^*$ |

A scheme for re-transmitting MIMO packets using three transmit antennas in accordance with a further embodiment of the present invention is shown in Table 10 (mapping-3). The scheme of Table 10 is a closed loop scheme.

TABLE 10

|        | Tx-2    | Tx-3    | Tx-1    |
|--------|---------|---------|---------|
| Time 1 | $S_1$   | $S_2$   | $S_3$   |
| Time 2 | $-S_2^*$| $S_1^*$ | $S_3^*$ |
| Time 3 | $S_3$   | $S_1$   | $S_2$   |
| Time 4 | $-S_1^*$| $S_3^*$ | $S_2^*$ |
| Time 5 | $S_2$   | $S_3$   | $S_1$   |
| Time 6 | $-S_3^*$| $S_2^*$ | $S_1^*$ |

In summary, embodiments of the invention use one or more of the following principles:

1) The sequence of STC code mappings (times) for a given scheme is deterministic.

2) The result of using each STC code mapping in the sequence for retransmission is deterministic: It is known to have a better chance of successful transmission and receipt than its predecessor.

3) Each STC code mapping in a sequence is orthogonal or quasi-orthogonal with respect to its predecessor.

4) In a sequence of STC code mappings, each symbol is transmitted over all of the antennas.

5) In systems incorporating feedback the inter-code interference is minimized through the use of an index.

The following implementation details are included to provide an example of suitable hardware and software environment in which embodiments of the invention may be practiced.

Figure 2:
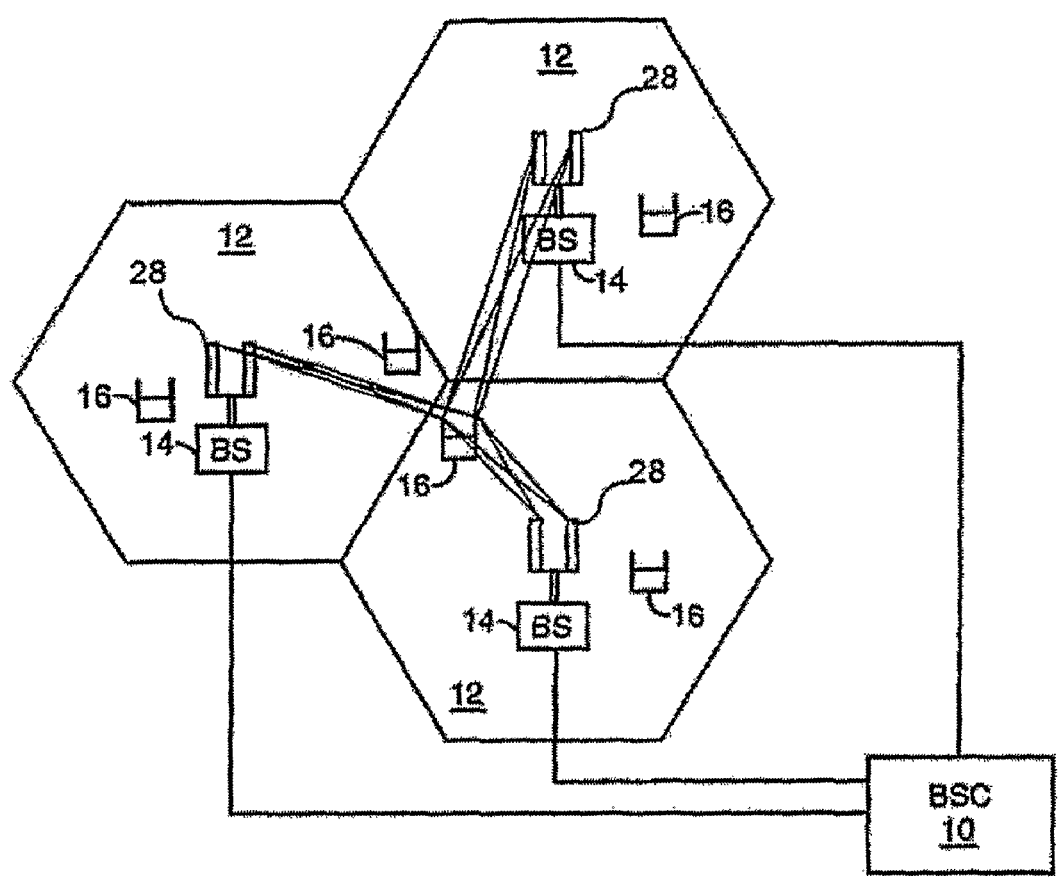
FIG. 2 illustrates a MIMO communication system in accordance with an embodiment of the present invention.

FIG. 2 illustrates a MIMO communication system 2 suitable for use with embodiments of the present invention. The MIMO communication system 2 implements the re-transmission schemes as shown in Tables 1-10.

The MIMO communication system 2 includes a base station controller (BSC) 10, and a plurality of cells 12. The base station controller 10 controls wireless communications within the multiple cells 12. Each cell 12 is served by the corresponding base station (BS) 14 and one or more antennas 28. Each base station 14 facilitates communications using OFDM with one or more mobile terminals 16 within the corresponding cell 12 associated with the base station 14 and antennas 28. The movement of the mobile terminals 16 in relation to the antennas 28 results in significant fluctuation in channel conditions. The base stations 14 and the mobile terminals 16 may both include multiple antennas to provide spatial diversity for communications.

A transmitter side of the MIMO communication system 2 re-transmits a packet to a receiver side of the MIMO communication system 2 in an open loop manner or closed loop manner, depending on feedback information from the mobile station 14. Note that the BSC does not specify how STC is formed, i.e. how the code is mapped to individual antennas.

Figure 3:
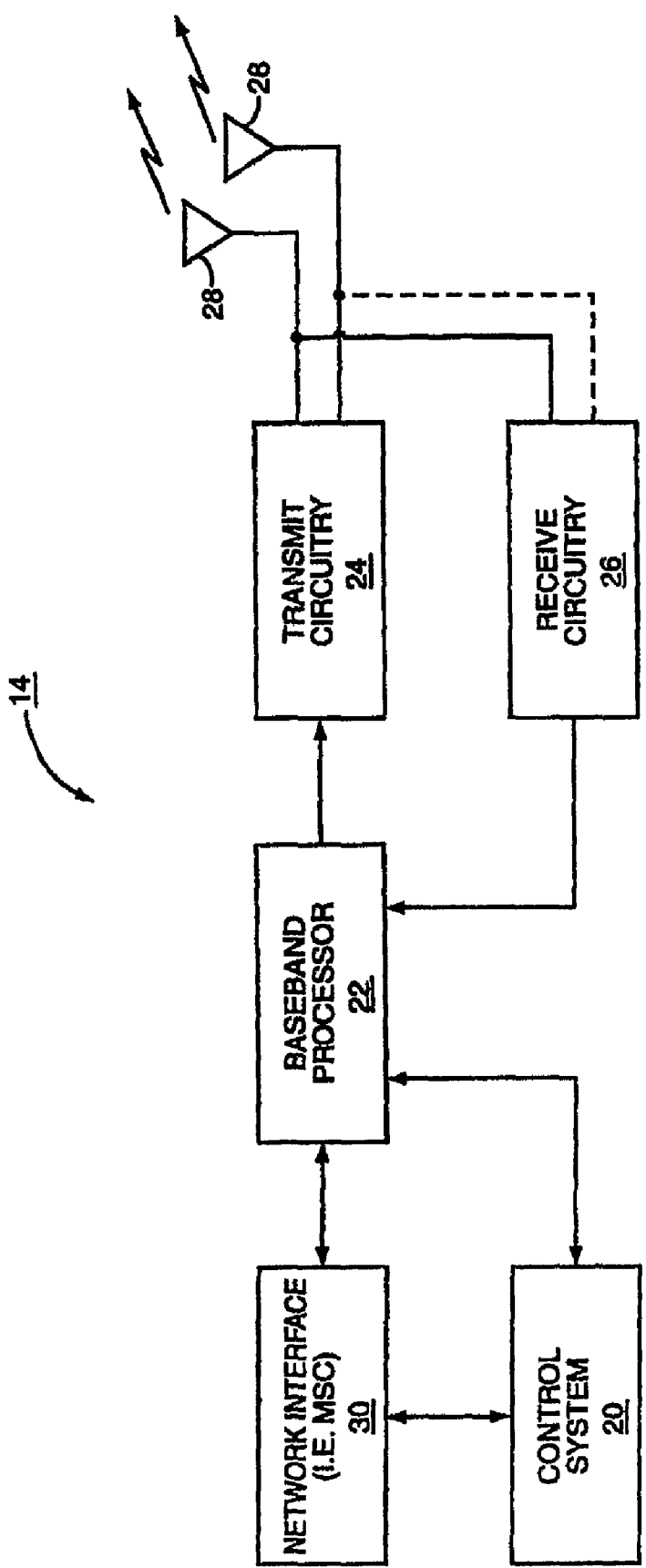
FIG. 3 illustrates a high level overview of the base station of FIG. 2.
Figure 4:
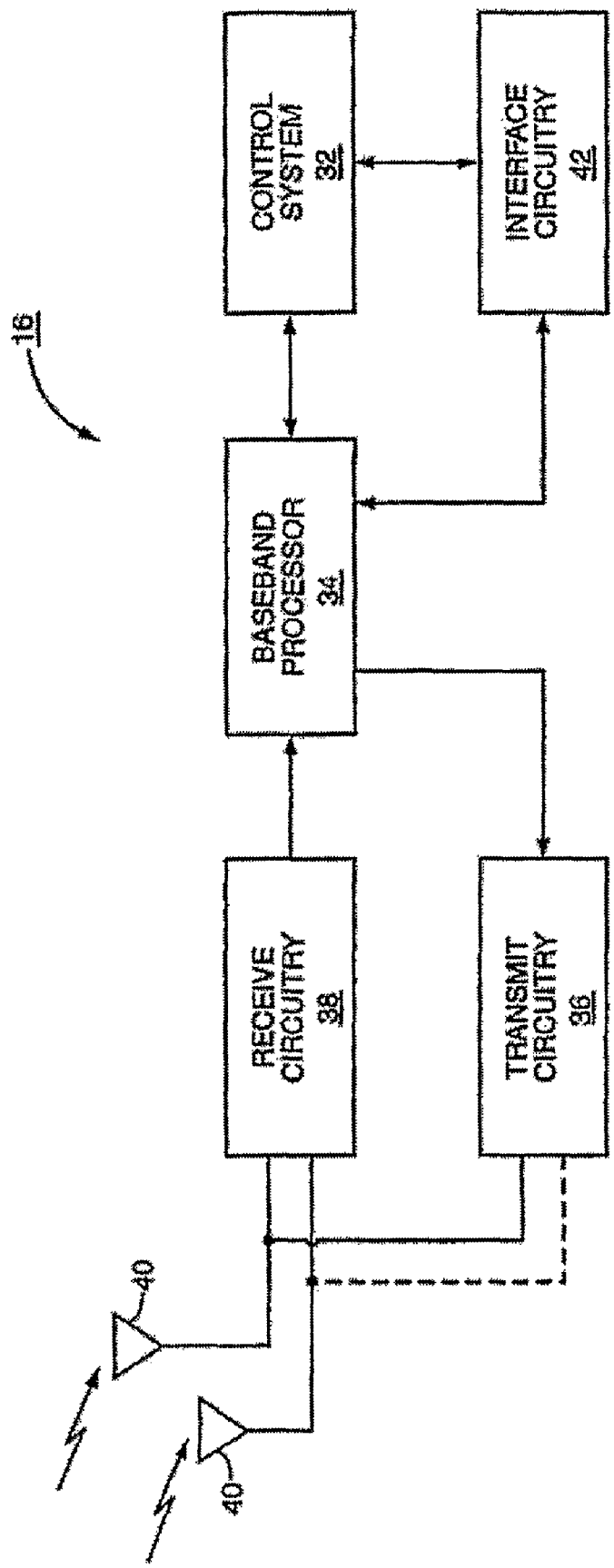
FIG. 4 illustrates a high level overview of the mobile station of FIG. 2.

FIG. 3 illustrates a high level overview of the base station 14 of FIG. 2. FIG. 4 illustrates a high level overview of the mobile station 16 of FIG. 2 and is associated with the base station 14 of FIG. 2.

Referring to FIGS. 2-3, the base station 14 includes a control system 20, a baseband processor 22, transmit circuitry 24, receive circuitry 26, one or more antennas 28, and a network interface 30. The receive circuitry 26 receives radio frequency signals bearing information from one or more remote transmitters provided by the mobile terminals 16 (of FIG. 4). Preferably, a low noise amplifier and a filter (not shown) cooperate to amplify and remove broadband interference from the signal for processing. Down-conversion and digitization circuitry (not shown) down-converts the filtered, received signal to an intermediate or baseband frequency signal, which is digitized into one or more digital streams.

The baseband processor 22 processes the digitized received signal to extract the information or data bits conveyed in the received signal. This processing includes demodulation, decoding, and error correction operations. The baseband processor 22 may be implemented in one or more digital signal processors (DSPs) or application-specific integrated circuits (ASICs). The received information is sent across a network via the network interface 30 or transmitted to another mobile terminal 16 serviced by the base station 14.

On the transmit side, the baseband processor 22 receives digitized data from the network interface 30 under the control of the control system 20, and encodes the data for transmission. The digitized data may include voice, data, or control information. The encoded data is output to the transmit circuitry 24, where the digitized data is modulated by a carrier signal having a desired transmit frequency or frequencies. A power amplifier (not shown) amplifies the modulated carrier signal to a level appropriate for transmission, and delivers the modulated carrier signal to the antennas 28 through a matching network (not shown). Modulation and processing are described in detail below. Various modulation and processing techniques available to those skilled in the art are applicable to the system of FIG. 3.

Referring to FIGS. 2 and 4, the mobile terminal 16 includes a control system 32, a baseband processor 34, transmit circuitry 36, receive circuitry 38, multiple antennas 40, and user interface circuitry 42. The receive circuitry 38 receives radio frequency signals bearing information from one or more base stations 14. Preferably, a low noise amplifier and a filter (not shown) cooperate to amplify and remove broadband interference from the signal for processing. Downconversion and digitization circuitry (not shown) downconvert the filtered, received signal to an intermediate or baseband frequency signal, which is digitized into one or more digital streams.

The baseband processor 34 processes the digitized received signal to extract the information or data bits conveyed in the received signal. This processing includes demodulation, decoding, and error correction operations as described below. The baseband processor 34 may be implemented in one or more digital signal processors (DSPs) and application specific integrated circuits (ASICs).

For transmission, the baseband processor 34 receives digitized data from the control system 32, which it encodes for transmission. The digitized data may include voice, data, or control information. The encoded data is output to the transmit circuitry 36, where it is used by a modulator to modulate a carrier signal that is at a desired transmit frequency or frequencies. A power amplifier (not shown) amplifies the modulated carrier signal to a level appropriate for transmission, and delivers the modulated carrier signal to the antennas 40 through a matching network (not shown). Various modulation and processing techniques available to those skilled in the art are applicable to the system of FIG. 4.

In OFDM modulation, the transmission band is divided into multiple, orthogonal carrier waves. Each carrier wave is modulated according to the digital data to be transmitted. Because OFDM divides the transmission band into multiple carriers, the bandwidth per carrier decreases and the modulation time per carrier increases. Since the multiple carriers are transmitted in parallel, the transmission rate for the digital data, or symbols, on any given carrier is lower than when a single carrier is used.

OFDM modulation implements an Inverse Fast Fourier Transform (IFFT) on the information to be transmitted. For demodulation, a Fast Fourier Transform (FFT) is implemented on the received signal to recover the transmitted information. In practice, the IFFT and FFT may be provided by digital signal processing carrying out an Inverse Discrete Fourier Transform (IDFT) and Discrete Fourier Transform (DFT), respectively. Accordingly, the characterizing feature of the OFDM modulation is that orthogonal carrier waves are generated for multiple bands within a transmission channel. The modulated signals are digital signals having a relatively low transmission rate and capable of staying within their respective bands. The individual carrier waves are not modulated directly by the digital signals. Instead, all carrier waves are modulated at once by IFFT processing.

In one embodiment, OFDM is used for at least the downlink transmission from the base stations 14 to the mobile terminals 16. Each base station 14 is equipped with n (n>1) transmit antennas 28, and each mobile terminal 16 is equipped with m (n>1) receive antennas 40. It is noted that the respective antennas may be used for reception and transmission using appropriate duplexers or switches, and that they are shown separately and so labeled only for clarity.

Figure 5:
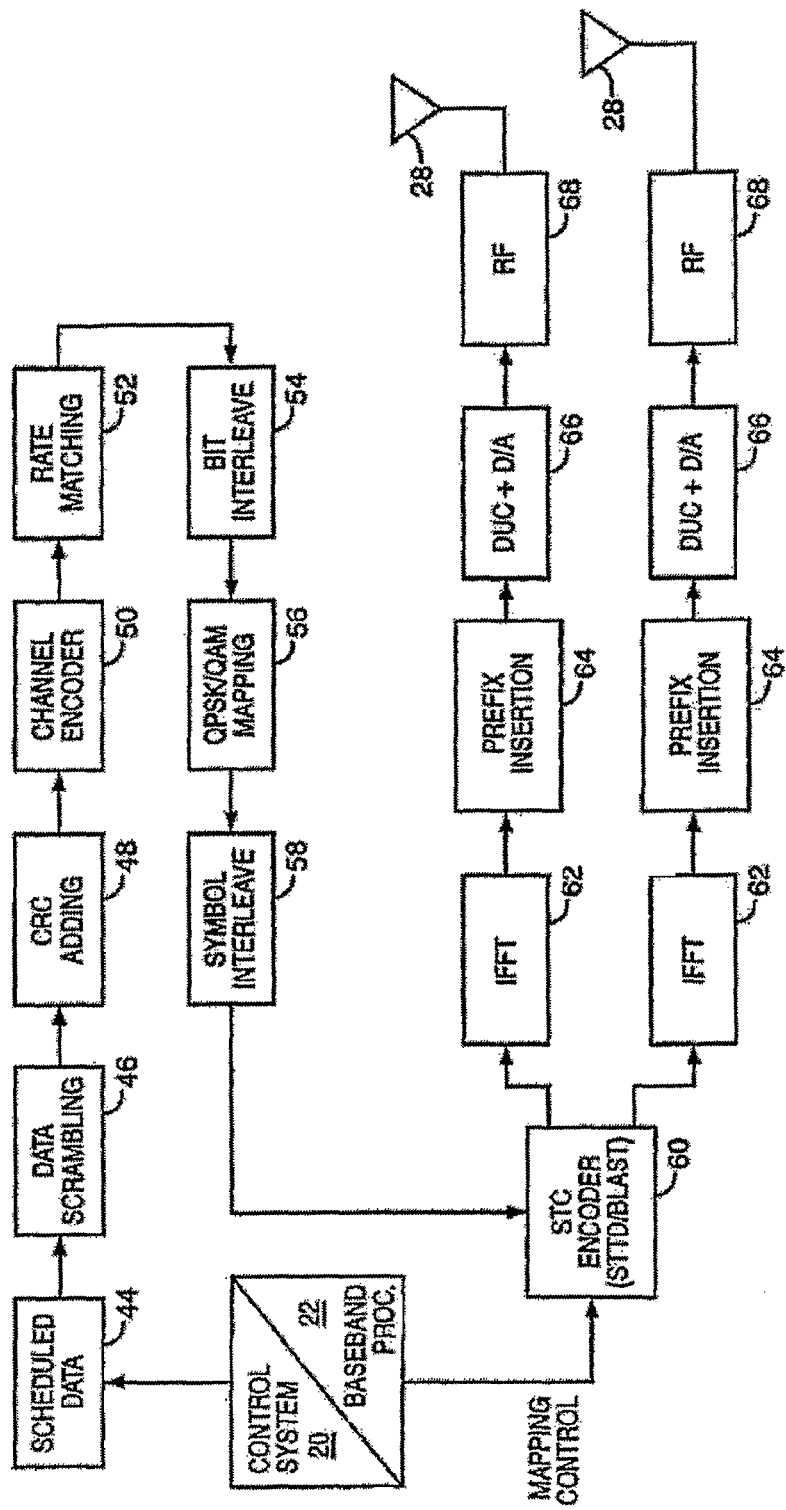
FIG. 5 illustrates one example of a logical OFDM transmission architecture applicable to the MIMO communication system of FIG. 1.
Figure 6:
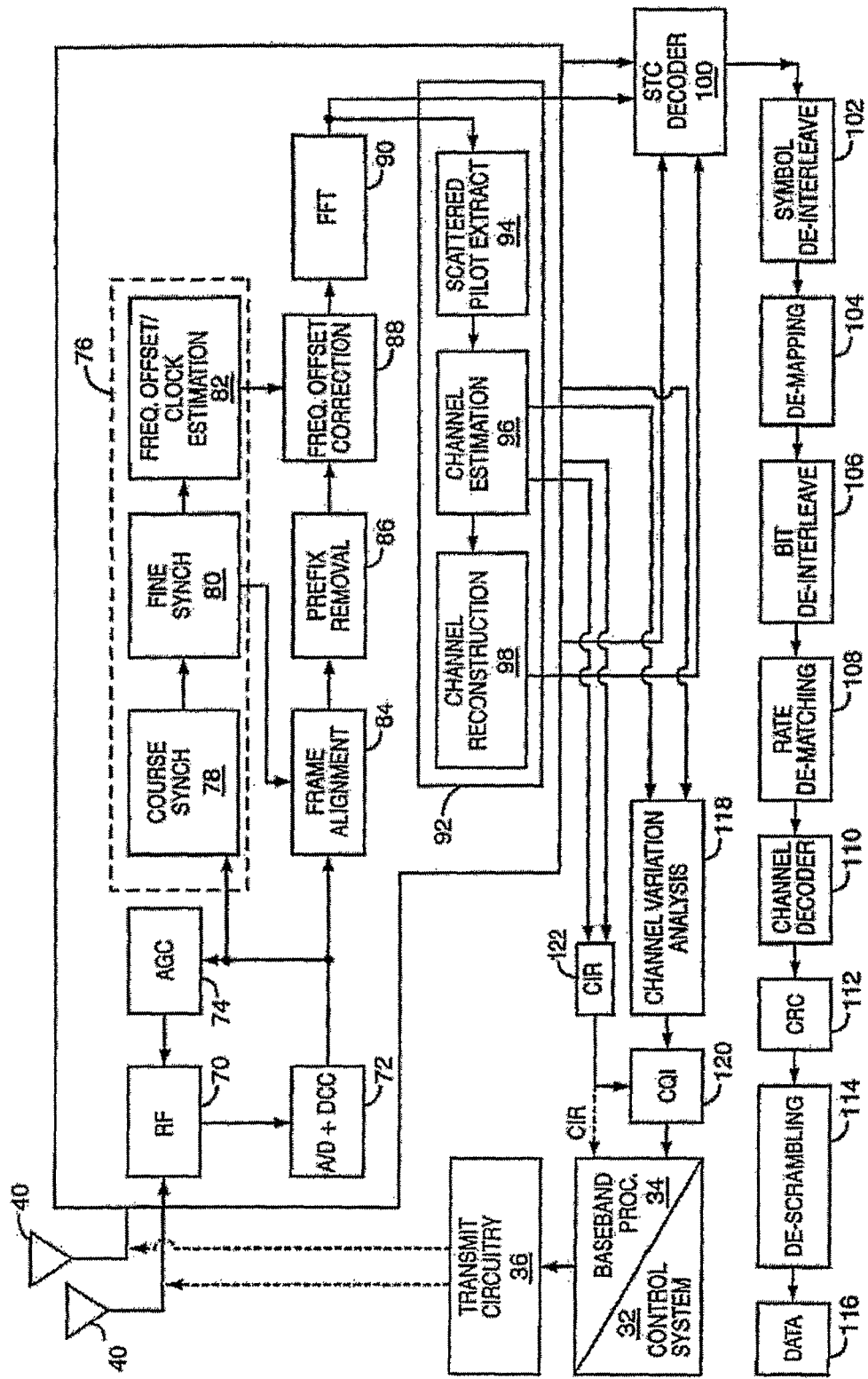
FIG. 6 illustrates one example of reception architecture associated with the logical OFDM transmission architecture of FIG. 5.

FIG. 5 illustrates a logical OFDM transmission architecture applicable to the MIMO communication system 2 of FIG. 1. Initially, the base station controller 10 sends data to be transmitted to various mobile terminals 16 to the base station 14. In some embodiments, the base station 14 uses Channel Quality Indicators (CQIs) associated with the mobile terminals to schedule the data for transmission as well as select appropriate coding and modulation for transmitting the scheduled data. The CQIs may be directly from the mobile terminals 16 or determined at the base station 14 based on information provided by the mobile terminals 16. In either case, the CQI for each mobile terminal 16 is a function of the degree to which the channel amplitude (or response) varies across the OFDM frequency band. The Base station controller distributes data to the BTSs (FIG. 5, downlink) and combines data received by the BTSs (FIG. 6, uplink).

The scheduled data 44, which is a stream of bits, is scrambled in a manner that reduces the peak-to-average power ratio associated with the data using data scrambling logic 46. A cyclic redundancy check (CRC) for the scrambled data is determined and appended to the scrambled data using CRC adding logic 48. Next, channel coding is performed using channel encoder logic 50 to effectively add redundancy to the data to facilitate recovery and error correction at the mobile terminal 16. Again, the channel coding for a particular mobile terminal 16 is based on the CQI. In some embodiments the channel encoder logic 50 uses known Turbo encoding techniques. The encoded data is then processed by rate matching logic 52 to compensate for the data expansion associated with encoding.

Bit interleaver logic 54 systematically reorders the bits in the encoded data to minimize the loss of consecutive data bits. The resultant data bits are systematically mapped into corresponding symbols depending on the chosen baseband modulation by mapping logic 56. Preferably, Quadrature Amplitude Modulation (QAM) or Quadrature Phase Shift Key (QPSK) modulation is used. The degree of modulation is preferably chosen based on the CQI for the particular mobile terminal. The symbols may be systematically reordered to further bolster the immunity of the transmitted signal to periodic data loss caused by frequency selective fading using symbol interleaver logic 58.

At this point, groups of bits have been mapped into symbols representing locations in an amplitude and phase constellation. When spatial diversity is desired, blocks of symbols are then processed by space-time block code (STC) encoder logic 60, which modifies the symbols in a fashion making the transmitted signals more resistant to interference and more readily decoded at a mobile terminal 16. The STC encoder logic 60 processes the incoming symbols and provides n outputs corresponding to the number of transmit antennas 28 for the base station 14. The control system 20 and/or baseband processor 22 provides a mapping control signal to control STC encoding. The control system 20 determines when STTD or BLAST is used, as well as how STTD is constructed, according to the condition of the current channel. At this point, assume the symbols for the n outputs are representative of the data to be transmitted and capable of being recovered by the mobile terminal 16.

For the present example, assume the base station 14 has two antennas 28 (n=2) and the STC encoder logic 60 provides two output streams of symbols. There are two paths between the STC encoder logic 60 to the two antennas 28. Each of the symbol streams output by the STC encoder logic 60 is sent to a corresponding IFFT processor 62, illustrated separately for ease of understanding. In FIG. 5, one processor 62 is illustrated for each path to the corresponding antenna 28. However, one or more processors may be used to provide such digital signal processing, alone or in combination with other processing described herein. The IFFT processors 62 preferably operate on the respective symbols to provide an inverse Fourier Transform. The output of the IFFT processors 62 provides symbols in the time domain. The time domain symbols are grouped into frames, which are associated with a prefix using like insertion logic 64. Each of the resultant signals is up-converted in the digital domain to an intermediate frequency and converted to an analog signal via the corresponding digital up-conversion (DUC) and digital-to-analog (D/A) conversion circuitry 66. The resultant (analog) signals are then simultaneously modulated at the desired RF frequency, amplified, and transmitted via the RF circuitry 68 and antennas 28. It is noted that pilot signals known by the intended mobile terminal 16 are scattered among the subcarriers. The mobile terminal 16, which is discussed in detail below, will use the pilot signals for channel estimation.

FIG. 6 illustrates receiver architecture for the receiving of the transmitted signals by the mobile terminal 16 of FIGS. 1 and 4, associated with the logical OFDM transmission architecture of FIG. 5.

Upon arrival of the transmitted signals at each of the antennas 40 of the mobile terminal 16, the respective signals are demodulated and amplified by corresponding RF circuitry 70. In FIG. 6, only one of the two receive paths is described and illustrated in detail. Analog-to-digital (A/D) converter and down-conversion circuitry 72 digitizes and down-converts the analog signal for digital processing. The resultant digitized signal may be used by automatic gain control circuitry (AGC) 74 to control the gain of the amplifiers in the RF circuitry 70 based on the received signal level.

Initially, the digitized signal is provided to synchronization logic 76, which includes coarse synchronization logic 78, which buffers several OFDM symbols and calculates an auto-correlation between the two successive OFDM symbols. A resultant time index corresponding to the maximum of the correlation result determines a fine synchronization search window, which is used by fine synchronization logic 80 to determine a precise framing starting position based on the headers. The output of the fine synchronization logic 80 facilitates frame acquisition by frame alignment logic 84. Proper framing alignment is important so that subsequent FFT processing provides an accurate conversion from the time to the frequency domain. The fine synchronization algorithm is based on the correlation between the received pilot signals carried by the headers and a local copy of the known pilot data. Once frame alignment acquisition occurs, the prefix of the OFDM symbol is removed with prefix removal logic 86 and resultant samples are sent to frequency offset correction logic 88, which compensates for the system frequency offset caused by the unmatched local oscillators in the transmitter and the receiver. Preferably, the synchronization logic 76 includes frequency offset and clock estimation logic 82, which is based on the headers to help estimate such effects on the transmitted signal and provide those estimations to the correction logic 88 to properly process OFDM symbols.

At this point, the OFDM symbols in the time domain are ready for conversion to the frequency domain using FFT processing logic 90. The results are frequency domain symbols, which are sent to processing logic 92. The processing logic 92 extracts the scattered pilot signal using scattered pilot extraction logic 94, determines a channel estimate based on the extracted pilot signal using channel estimation logic 96, and provides channel responses for all sub-carriers using channel reconstruction logic 98. In order to determine a channel response for each of the sub-carriers, the pilot signal is essentially multiple pilot symbols that are scattered among the data symbols throughout the OFDM sub-carriers in a known pattern in both time and frequency.

Figure 7:
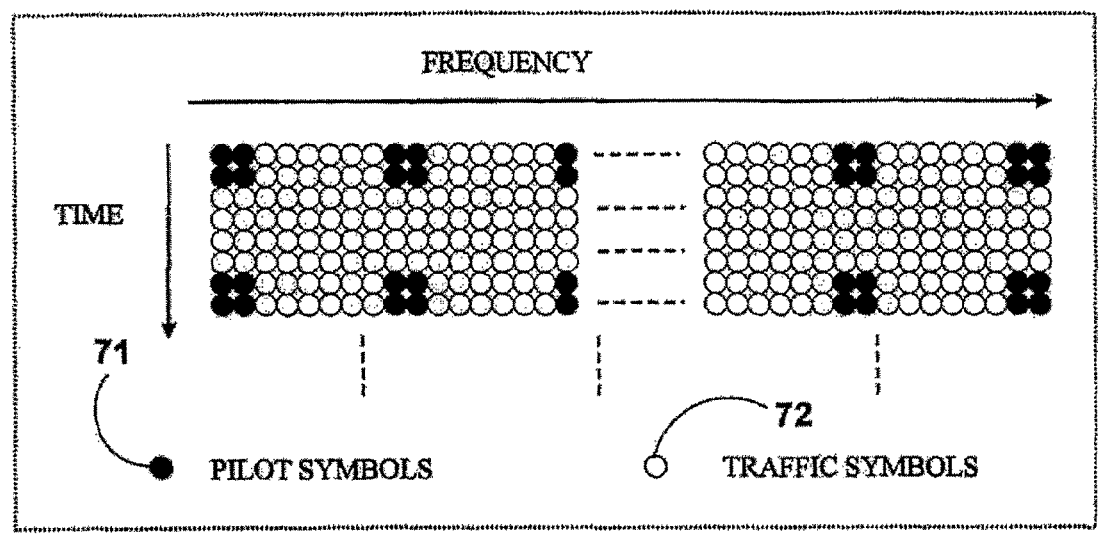
FIG. 7 illustrates an exemplary scattering of pilot symbols among available sub-carriers over a given time and frequency plot in an OFDM environment.

FIG. 7 illustrates an exemplary scattering of pilot symbols 71, together with traffic symbols 72 among available sub-carriers over a given time and frequency plot in an OFDM environment.

With reference to FIGS. 6-7, the processing logic 92 compares the received pilot symbols 71 with the pilot symbols that are expected in certain sub-carriers at certain times to determine a channel response for the sub-carriers in which pilot symbols were transmitted. The results are interpolated to estimate a channel response for most, if not all, of the remaining sub-carriers for which pilot symbols were not provided. The actual and interpolated channel responses are used to estimate an overall channel response, which includes the channel responses for most, if not all, of the sub-carriers in the OFDM channel.

The frequency domain symbols and channel reconstruction information, which are derived from the channel responses for each receive path are provided to an STC decoder 100, which provides STC decoding on both received paths to recover the transmitted symbols. The channel reconstruction information provides equalization information to the STC decoder 100 sufficient to remove the effects of the transmission channel when processing the respective frequency domain symbols.

The recovered symbols are placed back in order using symbol de-interleaver logic 102, which corresponds to the symbol interleaver logic 58 of the transmitter. The de-interleaved symbols are demodulated or de-mapped to a corresponding bitstream using de-mapping logic 104. The bits are de-interleaved using bit de-interleaver logic 106, which corresponds to the bit interleaver logic 54 of the transmitter architecture. The de-interleaved bits are processed by rate de-matching logic 108 and presented to channel decoder logic 110 to recover the initially scrambled data and the CRC checksum. Accordingly, CRC logic 112 removes the CRC checksum, checks the scrambled data in traditional fashion, and provides it to the de-scrambling logic 114 for de-scrambling using the known base station de-scrambling code to recover the originally transmitted data 116.

In parallel to recovering the data 116, a CQI, or at least information sufficient to create a CQI at the base station 14, is determined and transmitted to the base station 14. As described above, the CQI is a function of the carrier-to-interference ratio (CIR), as well as the degree to which the channel response varies across the various sub-carriers in the OFDM frequency band. For this embodiment, the channel gain for each sub-carrier in the OFDM frequency band being used to transmit information are compared relative to one another to determine the degree to which the channel gain varies across the OFDM frequency band. Although numerous techniques are available to measure the degree of variation, one technique is to calculate the standard deviation of the channel gain for each sub-carrier throughout the OFDM frequency band being used to transmit data.

The present invention has been described with regard to one or more embodiments. However, it will be apparent to persons skilled in the art that a number of variations and modifications can be made without departing from the scope of the invention as defined in the claims.

What is claimed is:

1. A method for minimizing errors in communicating packets, for use in a multiple-input-multiple-output (MIMO) space-time coded (STC) packet radio communications system having at least three transmit antennas, the method comprising:
 a) determining a sequence of at least three distinct transmitter STC code mappings for at least three time slots, the transmitter STC code mappings comprising at least three transformed STC symbols derived from at least three base STC symbols;
 b) transmitting a packet using a first STC code mapping in the sequence;
 c) detecting a first transmission error and retransmitting the packet using a subsequent STC code mapping in the sequence;
 d) detecting a subsequent transmission error and, if there are further STC code mappings, retransmitting the packet using a further subsequent STC code mapping in the sequence, else retransmitting the packet using the first STC code mapping in the sequence;
e) repeating the step d) as necessary;
wherein the sequence of at least three distinct transmitter STC code mappings is such that each of the at least three transformed STC symbols is transmitted over the at least three antennas in the at least three time slots.

2. The method of claim 1 wherein the radio communications system includes Orthogonal Frequency Division Multiplexing.

3. The method of claim 1 wherein the radio communications system uses Quadrature Amplitude Modulation (QAM) or Quadrature Phase Shift Key (QPSK) modulation.

4. The method according to claim 1, wherein each transformed STC symbol is derived from the base STC symbols using an operator selected from the group comprising unity, non-unity, conjugate, negative and imaginary.

5. A method for minimizing transmission errors, for use in a multiple-input-multiple-output (MIMO) space-time coded packet radio communications system having four transmit antennas, the method comprising:
a) determining a sequence of at least four distinct transmitter STC code mappings for at least four time slots, the transmitter STC code mappings comprising at least four transformed STC symbols derived from at least four base STC symbols;
b) transmitting a packet using a first STC code mapping in the sequence;
c) detecting a first transmission error;
d) retransmitting the packet using a second STC code mapping in the sequence;
e) detecting a second transmission error;
f) retransmitting the packet using a third STC code mapping in the sequence;
g) detecting a third transmission error;
h) retransmitting the packet using a fourth STC code mapping in the sequence;
i) detecting a fourth transmission error;
j) retransmitting the packet using a subsequent STC code mapping in the sequence;
k) detecting a subsequent transmission error; and
l) repeating the steps j) and k) as necessary,
wherein the sequence of at least four distinct transmitter STC code mappings is such that each of the at least four transformed STC symbol is transmitted over the four antennas in the at least four time slots.

6. The method of claim 5 wherein, if there are more transmissions and retransmissions than there are STC code mappings, the step 1) is replaced by the step of:
restarting at the step b).

7. The method of claim 5 wherein each of the STC code mappings is defined in accordance with a sequence as defined in a table, the table following:

|        | Tx-1     | Tx-2    | Tx-3     | Tx-4    |
|--------|----------|---------|----------|---------|
| Time 1 | $S_1$    | $S_2$   | $S_3$    | $S_4$   |
| Time 2 | $-S_2^*$ | $S_1^*$ | $-S_4^*$ | $S_3^*$ |
| Time 3 | $S_3$    | $S_4$   | $S_1$    | $S_2$   |
| Time 4 | $-S_4^*$ | $S_3^*$ | $-S_2^*$ | $S_1^*$ |

8. The method of claim 7 wherein each of the STC code mappings also includes a signal weighting for each antenna.

9. The method of claim 5 wherein each of the STC code mappings is defined in accordance with a sequence as defined in a table, the table following:

|        | Tx-1     | Tx-2     | Tx-3    | Tx-4    |
|--------|----------|----------|---------|---------|
| Time 1 | $S_1$    | $S_3$    | $S_2$   | $S_4$   |
| Time 2 | $-S_2^*$ | $-S_4^*$ | $S_1^*$ | $S_3^*$ |
| Time 3 | $S_3$    | $S_1$    | $S_4$   | $S_2$   |
| Time 4 | $-S_4^*$ | $-S_2^*$ | $S_3^*$ | $S_1^*$ |

10. The method of claim 5 wherein each of the STC code mappings is defined in accordance with a sequence as defined in a table, the table following:

|        | Tx-1     | Tx-2     | Tx-3    | Tx-4    |
|--------|----------|----------|---------|---------|
| Time 1 | $S_1$    | $S_3$    | $S_4$   | $S_2$   |
| Time 2 | $-S_2^*$ | $-S_4^*$ | $S_3^*$ | $S_1^*$ |
| Time 3 | $S_3$    | $S_1$    | $S_2$   | $S_4$   |
| Time 4 | $-S_4^*$ | $-S_2^*$ | $S_1^*$ | $S_3^*$ |

11. The method of claim 5 wherein each of the STC code mappings is defined in accordance with a sequence as defined in a table, the table following

|        | Tx-1     | Tx-2    | Tx-3     | Tx-4     |
|--------|----------|---------|----------|----------|
| Time 1 | $S_1$    | $S_2$   | $S_3$    | $S_4$    |
| Time 2 | $-S_2^*$ | $S_1^*$ | $-S_4^*$ | $S_3^*$  |
| Time 3 | $S_3$    | $S_4$   | $S_1$    | $S_2$    |
| Time 4 | $-S_4^*$ | $S_3^*$ | $-S_2^*$ | $-S_1^*$ |
| Time 5 | $S_1$    | $S_3$   | $S_2$    | $S_4$    |
| Time 6 | $-S_2^*$ | $-S_4^*$| $S_1^*$  | $S_3^*$  |
| Time 7 | $S_2$    | $S_4$   | $S_1$    | $S_3$    |
| Time 8 | $S_1^*$  | $S_3^*$ | $-S_2^*$ | $-S_4^*$ |

12. The method of claim 5 wherein each of the STC code mappings is defined in accordance with a sequence as defined in a table, the table following

|        | Tx-1     | Tx-2    | Tx-3     | Tx-4    |
|--------|----------|---------|----------|---------|
| Time 1 | $S_1$    | $S_2$   | $S_3$    | $S_4$   |
| Time 2 | $-S_2^*$ | $S_1^*$ | $-S_4^*$ | $S_3^*$ |
| Time 3 | $S_3$    | $S_4$   | $S_1$    | $S_2$   |
| Time 4 | $-S_4^*$ | $S_3^*$ | $-S_2^*$ | $S_1^*$ | and code-set indexes are fed back to a base transceiver station (BTS) thereby indicating how constituent codes in an STC are formed.

13. The method according to claim 5, wherein each transformed STC symbol is derived from the base STC symbols using an operator selected from the group comprising unity, non-unity, conjugate, negative and imaginary.

14. A method for minimizing transmission errors, for use in a multiple-input-multiple-output (MIMO) space-time coded packet radio communications system having three transmit antennas, the method comprising:
a) determining a sequence of at least six distinct transmitter STC code mappings for at least six time slots, the transmitter STC code mappings comprising at least three transformed STC symbols derived from at least three base STC symbols;

b) transmitting a packet using a first STC code mapping in the sequence;
c) detecting a first transmission error and retransmitting the packet using a second STC code mapping in the sequence in turn;
d) detecting a subsequent transmission error and, if there are further STC code mappings, retransmitting the packet using a further subsequent STC code mapping in the sequence in turn, else retransmitting the packet using the first STC code mapping in the sequence;
e) repeating the step d) as necessary,
wherein the sequence of at least six distinct transmitter STC code mappings is such that each of the at least three transformed STC symbols is transmitted over the three antennas in the at least six time slots.

15. The method of claim 14 wherein a code-set index is received thereby indicating how constituent codes are formed.

16. The method of claim 14 wherein each of the STC code mappings is defined in accordance with a sequence as defined in a table, the table following:

|        | Tx-1      | Tx-2      | Tx-3      |
|--------|-----------|-----------|-----------|
| Time 1 | $S_1$     | $S_2$     | $S_3$     |
| Time 2 | $-S_2^*$  | $S_1^*$   | $S_3^*$   |
| Time 3 | $S_3$     | $S_1$     | $S_2$     |
| Time 4 | $-S_1^*$  | $S_3^*$   | $S_2^*$   |
| Time 5 | $S_2$     | $S_3$     | $S_1$     |
| Time 6 | $-S_3^*$  | $S_2^*$   | $S_1^*$   |

17. The method of claim 16 wherein each of the STC code mappings also includes a signal weighting for each antenna.

18. The method of claim 14 wherein each of the STC code mappings is defined in accordance with a sequence as defined in a table, the table following:

|        | Tx-1      | Tx-3      | Tx-2      |
|--------|-----------|-----------|-----------|
| Time 1 | $S_1$     | $S_2$     | $S_3$     |
| Time 2 | $-S_2^*$  | $S_1^*$   | $S_3^*$   |
| Time 3 | $S_3$     | $S_1$     | $S_2$     |
| Time 4 | $-S_1^*$  | $S_3^*$   | $S_2^*$   |
| Time 5 | $S_2$     | $S_3$     | $S_1$     |
| Time 6 | $-S_3^*$  | $S_2^*$   | $S_1^*$   |

19. The method of claim 14 wherein each of the STC code mappings is defined in accordance with a sequence as defined in a table, the table following:

|        | Tx-2      | Tx-3      | Tx-1      |
|--------|-----------|-----------|-----------|
| Time 1 | $S_1$     | $S_2$     | $S_3$     |
| Time 2 | $-S_2^*$  | $S_1^*$   | $S_3^*$   |
| Time 3 | $S_3$     | $S_1$     | $S_2$     |
| Time 4 | $-S_1^*$  | $S_3^*$   | $S_2^*$   |
| Time 5 | $S_2$     | $S_3$     | $S_1$     |
| Time 6 | $-S_3^*$  | $S_2^*$   | $S_1^*$   |

20. The method according to claim 14, wherein each transformed STC symbol is derived from the base STC symbols using an operator selected from the group comprising unity, non-unity, conjugate, negative and imaginary.

21. A system for minimizing errors in communicating packets, for use in a multiple-input-multiple-output (MIMO) space-time coded packet radio communications system having at least three transmit antennas, the system comprising:
a) means for determining a sequence of at least three distinct transmitter STC code mappings for at least three time slots, the transmitter STC code mappings comprising at least three transformed STC symbols derived from at least three base STC symbols;
b) means for transmitting a packet using a first STC code mapping in the sequence;
c) means for detecting a first transmission error and means for retransmitting the packet using a subsequent STC code mapping in the sequence;
d) means for detecting a subsequent transmission error and, if there are further STC code mappings, retransmitting the packet using a further subsequent STC code mapping in the sequence, else retransmitting the packet using the first STC code mapping in the sequence,
wherein the sequence of at least three distinct transmitter STC code mappings is such that each of the at least three transformed STC symbols is transmitted over the at least three antennas in the at least three time slots.

22. The system according to claim 21, wherein each transformed STC symbol is derived from the base STC symbols using an operator selected from the group comprising unity, non-unity, conjugate, negative and imaginary.

23. A system for minimizing transmission errors, for use in a multiple-input-multiple-output (MIMO) space-time coded packet radio communications system having four transmit antennas, the system comprising:
a) means for determining a sequence of at least four distinct transmitter STC code mappings for at least four time slots, the transmitter STC code mappings comprising at least four transformed STC symbols derived from at least four base STC symbols;
b) means for transmitting a packet using a first STC code mapping in the sequence;
c) means for detecting a first transmission error;
d) means for retransmitting the packet using a second STC code mapping in the sequence;
e) means for detecting a second transmission error;
f) means for retransmitting the packet using a third STC code mapping in the sequence;
g) means for detecting a third transmission error;
h) means for retransmitting the packet using a fourth STC code mapping in the sequence;
i) means for detecting a fourth transmission error;
j) means for retransmitting the packet using a subsequent STC code mapping in the sequence;
k) means for detecting a subsequent transmission error,
wherein the sequence of at least four distinct transmitter STC code mappings is such that each of the at least four transformed STC symbols is transmitted over the four antennas in the at least four time slots.

24. The system according to claim 23, wherein each transformed STC symbol is derived from the base STC symbols using an operator selected from the group comprising unity, non-unity, conjugate, negative and imaginary.

25. A system for minimizing transmission errors, for use in a multiple-input-multiple-output (MIMO) space-time coded packet radio communications system having three transmit antennas, the system comprising:
a) means for determining a sequence of at least six distinct transmitter STC code mappings for at least six time slots, the transmitter STC code mappings comprising at least three transformed STC symbols derived from at least three base STC symbols;

b) means for transmitting a packet using a first STC code mapping in the sequence;
c) means for detecting a first transmission error and retransmitting the packet using a second STC code mapping in the sequence in turn;
d) means for detecting a subsequent transmission error and, if there are further STC code mappings, retransmitting the packet using a further subsequent STC code mapping in the sequence in turn, else retransmitting the packet using the first STC code mapping in the sequence, wherein the sequence of at least six distinct transmitter STC code mappings is such that each of the at least three transformed STC symbols is transmitted over the three antennas in the at least six time slots.

26. The system according to claim 25, wherein each transformed STC symbol is derived from the base STC symbols using an operator selected from the group comprising unity, non-unity, conjugate, negative and imaginary.

* * * * *